United States Patent [19]

Ting

[11] 4,133,158
[45] Jan. 9, 1979

[54] NON-COMPOSITE IMPACT-RESISTANT STRUCTURE

[75] Inventor: Raymond M. L. Ting, Pittsburgh, Pa.

[73] Assignee: H. H. Robertson Company, Pittsburgh, Pa.

[21] Appl. No.: 840,404

[22] Filed: Oct. 7, 1977

[51] Int. Cl.² .............................................. E04B 5/52
[52] U.S. Cl. ........................................ 52/478; 52/798; 52/821
[58] Field of Search ................ 52/618, 478, 625, 483, 52/336, 450, 629; 428/184, 185, 186

[56] References Cited

U.S. PATENT DOCUMENTS

| | | | |
|---|---|---|---|
| 1,625,061 | 4/1929 | Trout | 428/185 X |
| 2,258,858 | 10/1941 | Meadowcroft | 428/185 X |
| 3,394,514 | 7/1968 | Lindner | 52/618 X |
| 3,702,046 | 11/1972 | Lewis et al. | 52/618 X |
| 3,865,679 | 2/1975 | Hale | 52/618 X |
| 3,950,910 | 4/1976 | Pobanz | 52/618 |

Primary Examiner—Price C. Faw, Jr.
Assistant Examiner—Carl D. Friedman
Attorney, Agent, or Firm—Harry B. Keck; George E. Manias

[57] ABSTRACT

A non-composite impact-resistant structure of lightweight construction is particularly useful in offshore power stations where weight is a prime consideration, and also is useful as the roof of inland power stations. The structure is fabricated from two types of sheet metal units and reinforcing elements which are enclosed thereby. An inner cellular panel is secured to outboard members of a building framework. The cells of the inner cellular panel extend vertically or horizontally when used as a wall structure or may reside in a generally horizontal plane when used as a roof structure. Outer corrugated panels (or outer cellular panels) are secured outboard to the inner cellular panel with the corrugations (or cells) of the outer panel perpendicular to the cells of the inner panel. The inner cellular panel cooperates with the outer corrugated panels to define passageways providing peripheral metal enclosure for reinforcing elements. The reinforcing elements positioned within the passageways increase the shear resistance of the structure, increase membrane development in the inner cellular panels, and produce local damage to impacting tornado-borne debris. A decorative sheathing may be applied outboard of the outer corrugated panel, if desired.

13 Claims, 17 Drawing Figures

Fig. 1

TORNADO WIND VELOCITIES CONSIDERED IN NUCLEAR POWER PLANT DESIGN

|  | REGION | | |
|---|---|---|---|
|  | 1 | 2 | 3 |
| Tangential Velocity (mph) | 290 | 240 | 190 |
| Translational Velocity (mph) | 70 | 60 | 50 |
| Maximum Velocity (mph) | 360 | 300 | 240 |

Fig. 2

ANTICIPATED TYPES OF TORNADO BORNE DEBRIS

| A - Wood Plank | 4" x 12" x 12' long |
|---|---|
| B - Steel Rod | 1" O.D. x 3' long |
| C - Steel Pipe | 6" O.D., 15' long, Schedule 40 |
| D - Steel Pipe | 12" O.D., 15' long, Schedule 40 |
| E - Utility Pole | 13.5" O.D. x 35' long |
| F - Automobile | 28 sq. ft. frontal area |

Fig. 3

ANTICIPATED MAXIMUM MISSILE VELOCITIES

| Debris | Weight (lbs.) | Debris Velocity (mph) | | |
|---|---|---|---|---|
|  |  | Region 1 | Region 2 | Region 3 |
| A | 115 | 186 | 157 | 130 |
| B | 8.8 | 114 | 89.5 | 85 |
| C | 287 | 117 | 94 | 22.4 |
| D | 750 | 105 | 62.6 | 15.7 |
| E | 1224 | 123 | 107 | 58 |
| F | 3990 | 132 | 116 | 92 |

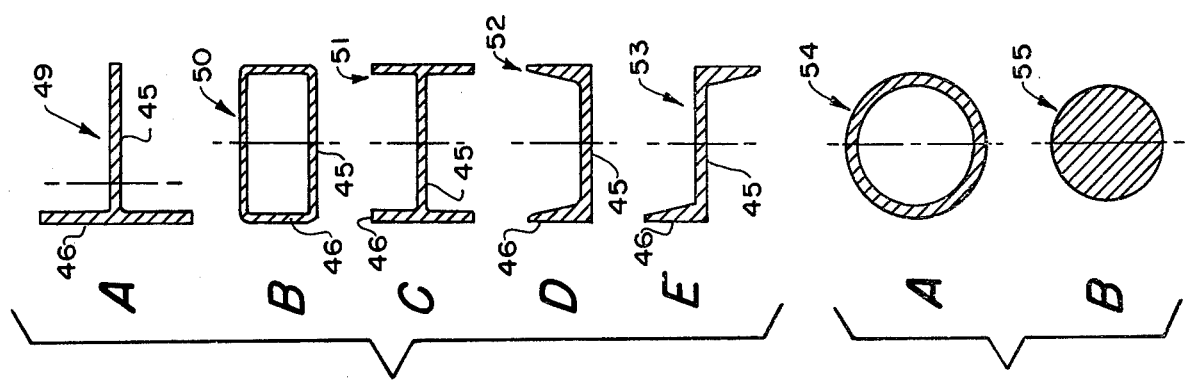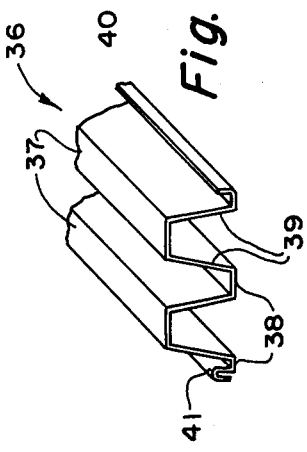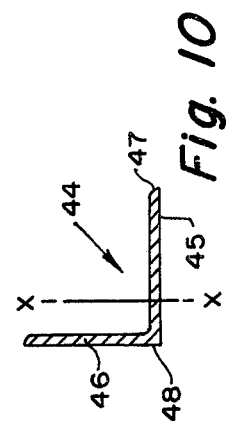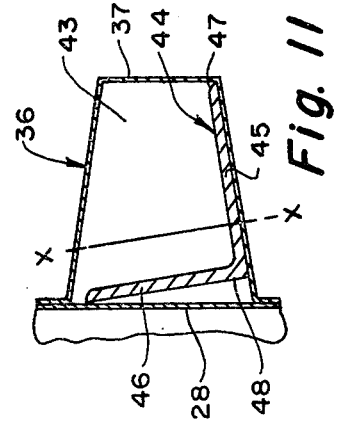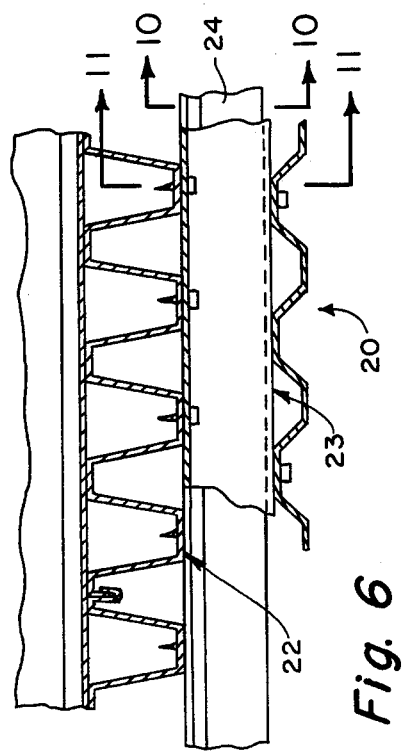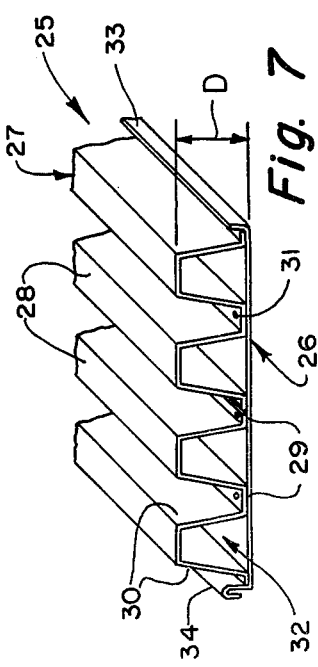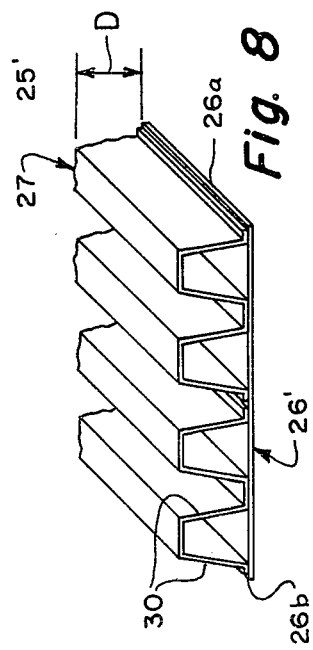

NON-COMPOSITE IMPACT-RESISTANT STRUCTURE

BACKGROUND OF THE INVENTION

1. Field of the Invention

A non-composite impact-resisting structure fabricated from sheet metal units and reinforcing elements.

2. Description of the Prior Art

Four basic types of impact-resistant wall structures are known in the art.

The customary impact-resistant wall structure — the reinforced concrete barrier (RCB) — is fabricated from reinforced concrete monolithic blocks. In the design of an RCB, concrete spalling at its interior face is the governing criterion for establishing the thickness of the RCB for an anticipated impact exposure. Concrete spalling creates hazardous high-velocity secondary missiles. Although the RCB provides the highest impact resistance, it is not only expensive from a materials standpoint, but also is heavy and space-consuming. A typical RCB may weigh 300 pounds per square foot.

A second type of impact-resistant wall — the stiffened steel plate barrier (SSPB) — is fabricated from armor-plate steel of substantial thickness. The SSPB is more flexible and undergoes a greater amount of deformation during impact. The SSPB offers lower impact dynamic reaction over a longer period of time. The SSPB is objectionable because of the cost, the weight and the difficulty of installation. A typical SSPB may weigh about 42 pounds per square foot.

Another impact-resistant wall structure — the composite panel barrier (CPB) — is known. See, for example, copending application serial number 723,983 filed Sept. 16, 1976 (now U.S. Pat. No. 4,078,350), and assigned to the assignee of the present invention. The CPB is fabricated from inner and outer sheet metal cellular panel units and concrete columns. For higher anticipated impact exposures, reinforcing rods may be embedded in certain or all of the concrete columns. For still higher anticipated impact exposures, reinforcing rods may also be provided in the cells of the outer sheet metal cellular panel units to increase the shear resistance. The CPB is objectionable for use in offshore power stations and in roof structures because of the weight. A typical CPB may weigh about 128 pounds per square foot.

Still another impact-resistant wall structure — the non-composite panel barrier (NCPB) — is known which is fabricated from one or more layers of sheet metal cellular units. When two or more layers are utilized, the cells of one layer extend perpendicular to the cells of the adjacent layers. See "Non-Composite and Composite Steel Panels for Tornado Missile Barrier Walls," by Raymond M. L. Ting, appearing in "Second ASCE Specialty Conference on Structural Design of Nuclear Plant Facilities," 1975, published by American Society of Civil Engineers. While the weight per square foot of the NCPB is less than that of each of the above-described barriers, its energy absorption capacity and shear resistance are considerably less than those of the above-described barriers.

SUMMARY OF THE INVENTION

The principal object of this invention is to provide an improved non-composite impact-resistant structure having a large energy absorption capacity.

Another object of this invention is to provide an improved non-composite impact-resistant structure having predictable and reproducible impact resistance.

Still another object of this invention is to provide an improved non-composite impact-resistant structure of lightweight construction which is particularly useful in offshore power systems, such as floating power stations where weight is of prime importance.

A still further object of this invention is to provide an improved non-composite impact-resistant structure which because of its lightweight construction is useful as a roof structure in buildings situated inland.

A non-composite impact-resistant structure capable of resisting all anticipated tornado-borne debris in Regions 1, 2 and 3 may be fabricated from:

a steel framework of parallel frame members including structural columns and beams or girders;

an inner sheath spanning the distance between parallel frame members, connected to outboard members of the parallel frame members, and fabricated from inner cellular panels;

an outer sheath disposed outboard of and secured to the inner cellular panel and fabricated from corrugated sheet metal panels or outer sheet metal cellular panels;

the outer sheath cooperates with the inner sheath to provide passageways which extend transversely of the cells of the inner sheet metal cellular panels; and plural reinforcing elements, one disposed within and extending through each of the passageways.

BRIEF DESCRIPTION OF THE DRAWINGS

FIG. 1 is a chart summarizing the tornado wind velocities considered in power plant design;

FIG. 2 is a list of anticipated types of wind-borne debris;

FIG. 3 is a chart summarizing the anticipated maximum velocities of the wind-borne debris identified in FIG. 2;

FIGS. 5 and 6 are fragmentary cross-sectional views taken along the lines 5—5 and 6—6 of FIG. 4;

FIGS. 7, 8 and 9 are fragmentary isometric views illustrating typical sheet metal units which are useful in constructing the non-composite impact-resistant structure of this invention;

FIG. 10 is a cross-sectional view taken along the line 10—10 of FIG. 6 illustrating a preferred reinforcing element;

FIG. 11 is a cross-sectional view taken along the line 11—11 of FIG. 6 illustrating the preferred reinforcing element disposed within a passageway of the structure of this invention;

FIGS. 12A through 12E are fragmentary cross-sectional views, similar to FIG. 10, illustrating alternative reinforcing elements;

FIGS. 14A and 14B are views similar to FIG. 10 illustrating further alternative reinforcing elements;

DESCRIPTION OF THE PREFERRED EMBODIMENTS

Introduction

Weather phenomena of different types and of varying intensities are known throughout the world. The continental United States has three distinct regions in which tornadoes of different maximum intensities can occur. Those properties of tornadoes which must be considered in the design of nuclear power plants and their maximum anticipated value in each of the three regions are indicated in FIG. 1. For a detailed discussion of these properties, their significance in the design of nuclear power plants, and identification of the aforesaid three regions of the continental United States, reference is directed to "Design Basis Tornado for Nuclear Power Plants," Regulatory Guide 1.76, *U.S. Nuclear Regulatory Commission* (1974).

As a result of a recent reevaluation, the anticipated types of tornado-borne debris and their anticipated maximum velocity for each of the three regions have been revised. The previously published types of debris and the anticipated maximum velocities thereof are indicated in FIGS. 1 and 2 of the aforesaid U.S. Pat. No. 4,078,350.

The revised list of anticipated types of debris now of concern in the design of nuclear power plants is provided in FIG. 2. The revised anticipated maximum velocities for each of the three regions are indicated in FIG. 3. For additional information concerning the revised data of FIGS. 2 and 3, reference is directed to revised Section 3.5.1.4 entitled "Missiles Generated by Natural Phenomena" appearing in Standard Review Plan, published in 1977 by the U.S. Nuclear Regulatory Commission.

Figure 5:
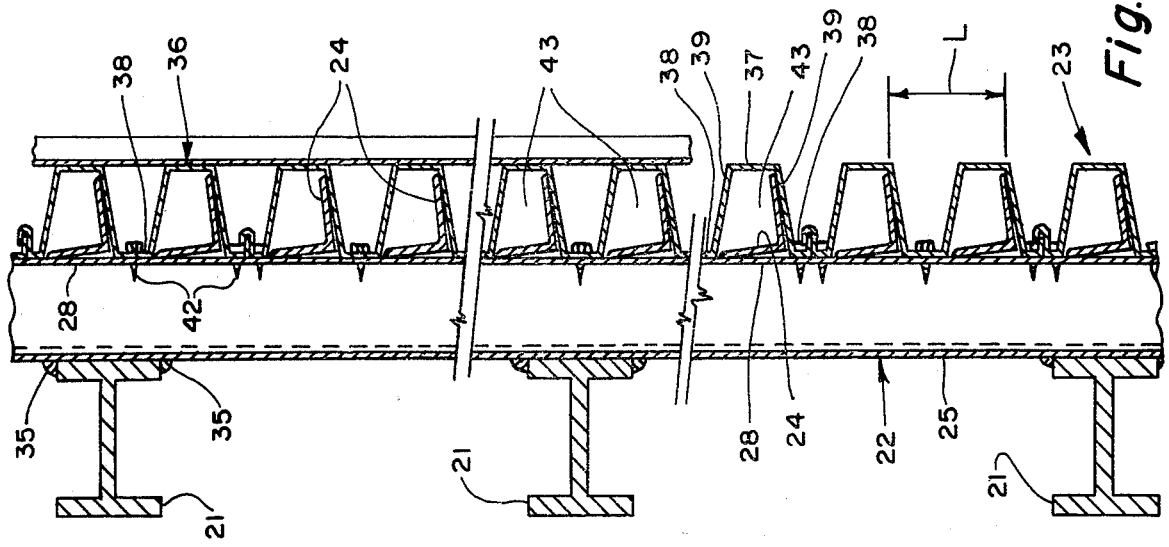
Figure 4:
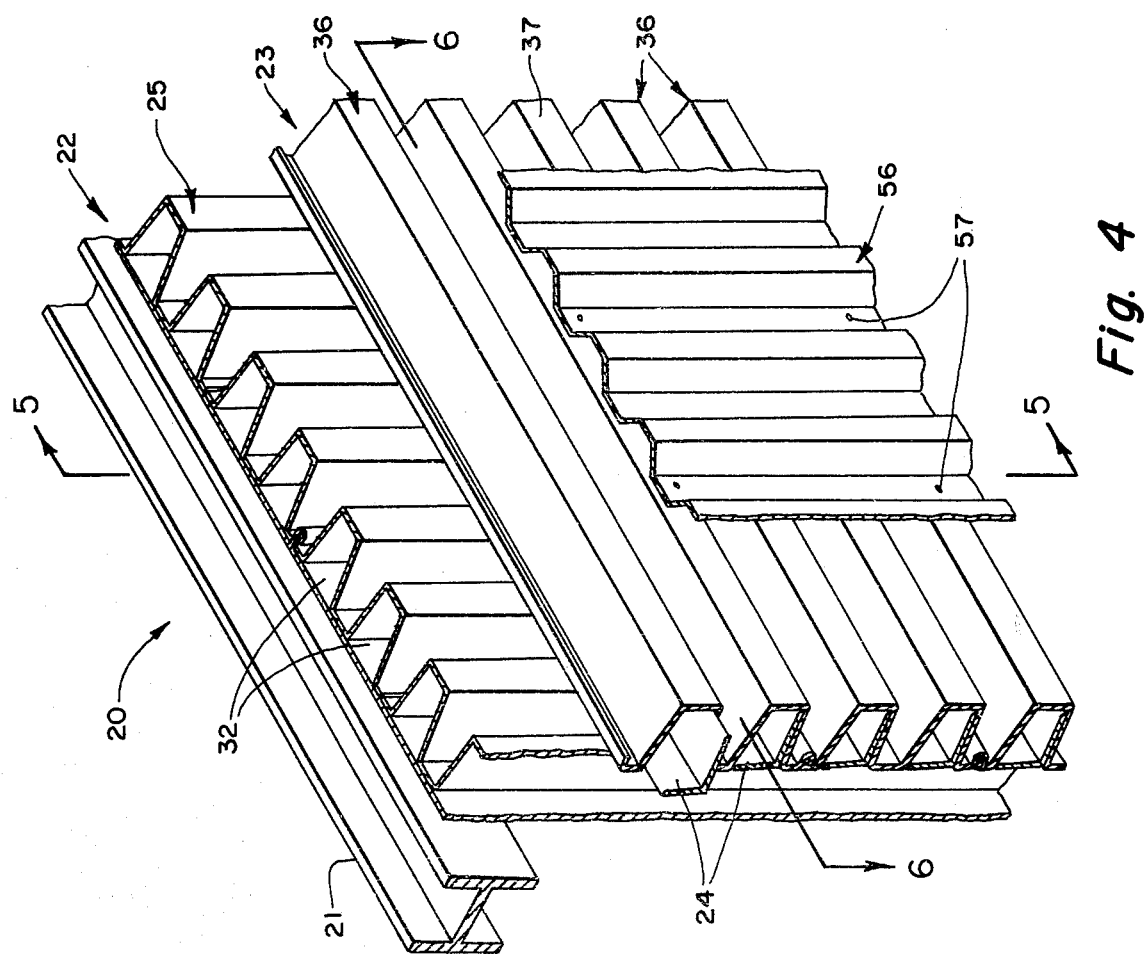
FIG. 4 is a fragmentary perspective illustration of one embodiment of a non-composite impact-resistant structure according to this invention.
Figure 13:
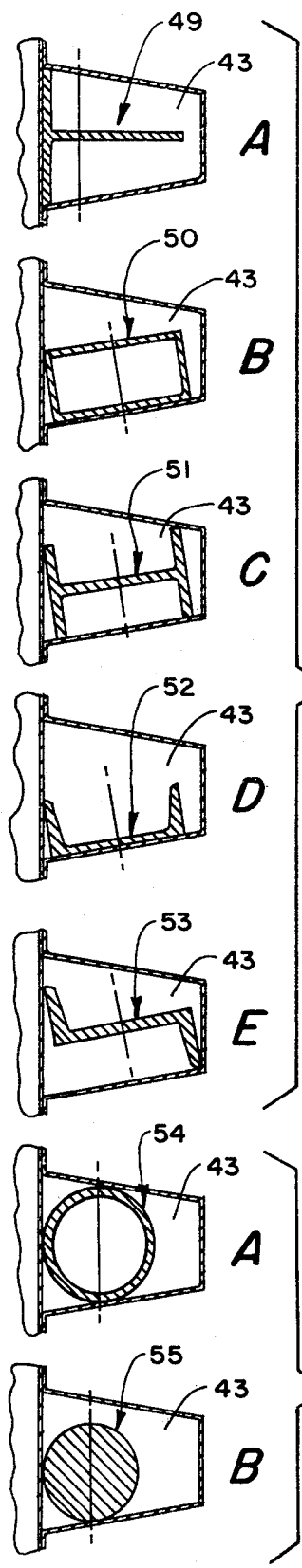
FIGS. 13A through 13E are views similar to FIG. 11 illustrating each of the reinforcing elements of FIGS. 12A—12E installed in a passageway of the structure of this invention.

FIGS. 4, 5 and 6 illustrate a non-composite impact-resistant structure 20 capable of resisting the tornado-borne debris identified in FIG. 2, traveling at the anticipated maximum velocities indicated in FIG. 3, in Regions 1, 2 and 3.

The structure 20, oriented vertically as in FIGS. 4 to 6, serves as the protective exterior wall for offshore (floating) power plant buildings. It is to be understood that since the structure 20 of this invention is of a lightweight construction, it can also be employed as a roof structure. Hence, FIGS. 4 to 6, while oriented vertically, are also intended to represent a roof structure.

As shown in FIGS. 4, 5 and 6, the present structure 20 is erected on parallel frame members 21 of a building framework. In general, the structure 20 includes an inner sheath 22, an outer sheath 23, and plural reinforcing elements 24. The structure 20 is a combined shear barrier and impact cushion which absorbs the kinetic energy of impacting debris.

When erected as a wall structure, the inner sheath 22 may extend vertically while the outer sheath 23 extends horizontally. Alternatively, a structure 20' (FIG. 16) may be erected wherein the inner sheath 22' extends horizontally and the outer sheath 23 extends vertically.

INNER SHEATH 22

Spanning the parallel frame members 21 and secured outboard thereof are inner sheet metal cellular panels 25 which constitute the inner sheath 22 for the non-composite impact-resistant structure 20. The inner cellular panels 25 (FIG. 7) are fabricated from a flat metal sheet 26 and a corrugated metal sheet 27. The corrugated metal sheet 27 includes coplanar crests 28, coplanar valleys 29, and sloping webs 30 connecting adjacent ones of the crests 28 and the valleys 29. The corrugated sheet 27 is joined to the flat metal sheet 26 by means of welds 31 which connect the valleys 29 with the contiguous portions of the flat metal sheet 26. The inner cellular panels 25 have parallel cells 32 defined by a crest 28, the two adjoining sloping webs 30 and the contiguous portion of the flat sheet 26. Lateral connecting means, such as a male lip 33 and a female lip 34, are formed along the opposite longitudinal edges of the flat sheet 26. The lateral connecting means permit the assembly of multiple inner cellular panels 25 in side-by-side connected relationship.

Figure 16:
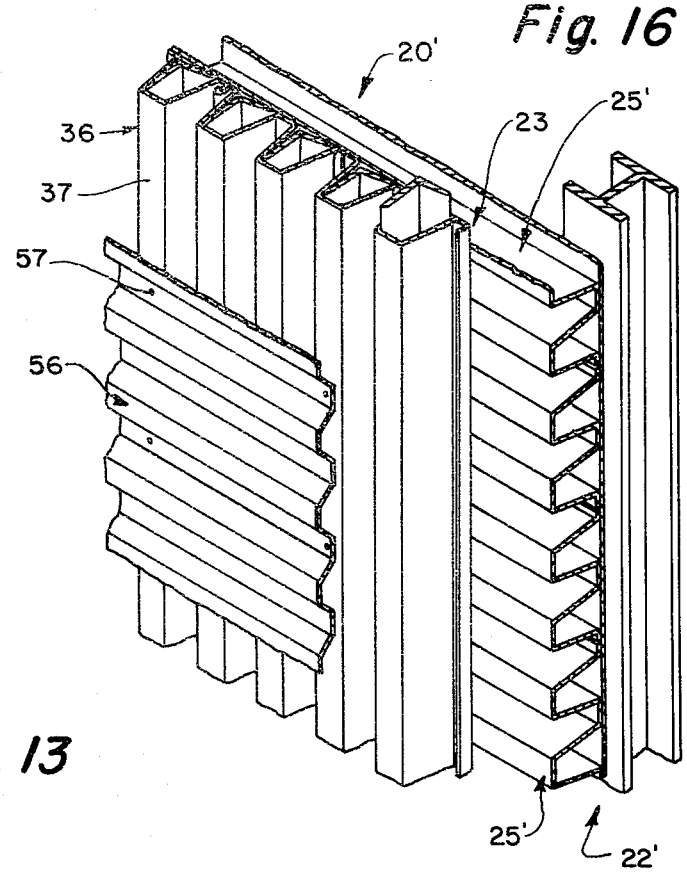
FIG. 16 is a fragmentary isometric view illustrating an alternative arrangement of the non-composite impact-resistant structure of FIG. 4.

Alternatively, inner cellular panels 25' (FIG. 8) may be employed which do not have lateral connecting means. The inner cellular panel 25' will be erected with the opposite longitudinal edges 26a, 26b of the flat metal sheet 26' proximate to but preferably abutting the corresponding edges of adjacent panels 25', as shown in FIG. 16.

The cellular panels 25 (25') are assembled from flat metal sheets 26 (26') and from corrugated sheets 27 which may be fabricated from cold-rolled steel having a thickness of from 16 to 12 gauge. The webs 30 preferably have a crush depth indicated at D of from 2 to 6 inches.

Reverting to FIGS. 4, 5 and 6, the inner cellular panels 25 are secured to the parallel frame members 21 by means of fillet welds 35 (visible in FIG. 5) connecting the edges of the frame members 21 with the inner surface of the flat metal sheet 26. Alternatively, the inner cellular panels 25 may be secured to the parallel frame members 21 by means of metal bolts extending through the valleys 29 and the frame members 21; or by means of metal screws passing through the valleys 29 and the frame members 10; or by means of welds through the valley portions 29 and the contiguous portions of the flat metal sheet 26.

The number of inner cellular panels 25 is sufficient to span the area where an impact-resistant structure is desired. It will be understood that multiple parallel frame members 21 are normally provided and that the inner cellular panels 25 span the distance between two or more of the horizontal frame members 21 as clearly illustrated in FIG. 5.

OUTER SHEATH 23

After all of the inner cellular panels 25 have been secured to the parallel frame members 21, the outer sheath 23 is applied. The outer sheath 23 may be formed from sheet metal corrugated panels 36 best illustrated in FIG. 7. The corrugated panel 36 has crests 37, valleys 38, and sloping webs 39. Lateral connecting means, such as a male lip 40 and a female lip 41, are formed along the opposite longitudinal sides of the panel 36 to facilitate the side-by-side joining of the panels 36 as illustrated in FIGS. 4 and 5.

Reverting to FIGS. 4 and 5, the corrugated panels 36 are installed with the corrugations thereof extending perpendicular to the direction of the cells 32 of the inner cellular panels 25. The corrugated panels 36 are secured to the inner cellular panels 25 by means of connections between the valleys 38 (of the panels 36) and the crests 28 (of the panels 25). The connection may be accomplished by means of metal screws 42 which extend through the valleys 38 and the crests 28. Alternatively, the connection may be accomplished by means of rivets which extend through the valleys 38 and the crests 28; or by means of welds.

As best shown in FIG. 5, the corrugated panels 36 cooperate with the inner cellular panels 25 to provide plural passageways 43. Each of the passageways 43 is formed by a portion of the crest 28 of the inner cellular panel 25 which extends between adjacent valleys 38 of the corrugated panel 36; and the overlying crest 37 and the adjoining webs 39 of the corrugated panel 36. Each of the passageways 44 receives one of the reinforcing elements 24.

The corrugated panel 36 may be fabricated from cold-rolled steel having a thickness of from 16 to 12 gauge.

Figure 17:
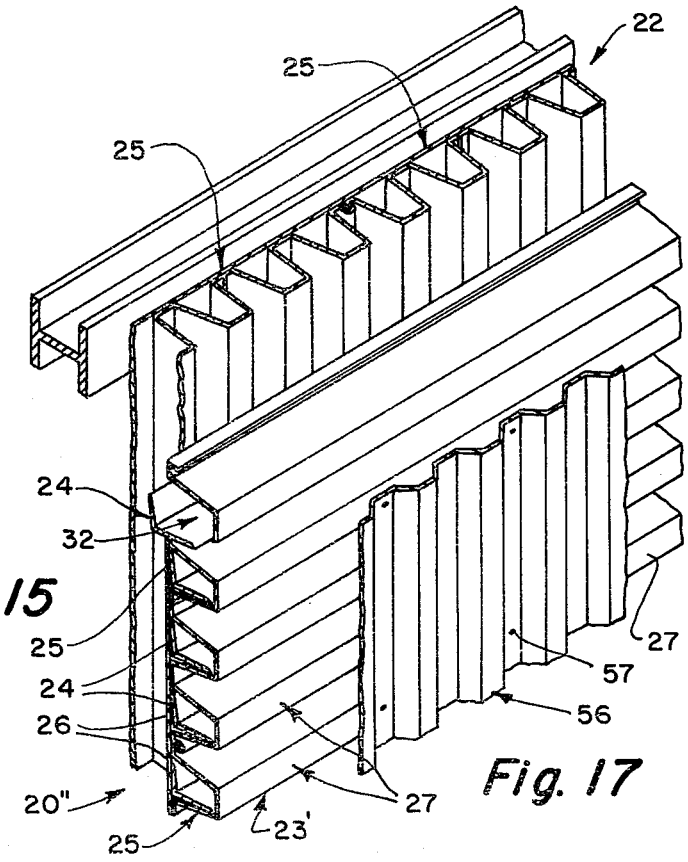
FIG. 17 is a fragmentary isometric view, similar to FIG. 4, illustrating an alternative embodiment of the non-composite impact-resistant structure of this invention.

Alternatively, a non-composite impact-resistant structure 20" (FIG. 17) may be provided wherein the outer sheath 23' thereof is formed from a plurality of the cellular panels 25 of FIG. 7. The reinforcing elements 24 reside within the cells 32 of the outer sheath 23'. The flat metal sheets 26 of the panels 25 of the outer sheath 23' increase the energy absorbing capacity of the structure 20" by preventing vertical spreading of the corrugated sheets 27 during impact.

REINFORCING ELEMENT 24

In accordance with this invention, the reinforcing element 24 renders the structure 20 resistant to penetration by the tornado-borne debris identified in FIG. 2, traveling at the velocities indicated in FIG. 3 for each of the Regions 1, 2 and 3. As a result of the cooperative contribution of the reinforcing elements 24 and the inner and outer sheaths 22, 23, the structure 20 provides a combined shear barrier and impact cushion which effectively absorbs the kinetic energy of impacting debris. The inner and outer sheaths 22, 23 exhibit relatively high plastic energy but are weakest in punching shear resistance. The reinforcing elements 24 serve three important functions.

1. The reinforcing elements 24 serve as a front shear barrier thereby increasing the punching shear resistance of the structure 20.
2. The lateral stiffness of the reinforcing elements 24 spreads the impact load over a greater area of the inner sheath 22 which results in increased membrane development in the inner sheath 22 and correspondingly increased use of the potential plastic energy of the inner sheath 22.
3. The reinforcing elements 24 also cause local damage to the impacting end of the debris thereby decreasing the ability of the impacting debris to penetrate the structure 20.

Thus, in accordance with the present invention, the reinforcing elements 24 must provide adequate lateral load distribution and adequate shear punch resistance. It has been determined that to obtain adequate lateral load distribution, the reinforcing element must have a moment of inertia with respect to a centroidal axis thereof which extends generally parallel with the plane of the structure, of at least 2.8 inches$^4$. It has also been determined that to obtain adequate shear punch resistance, the reinforcing element must have a transverse cross-sectional area of at least 1.2 square inches.

The reinforcing elements 24 must be uniformly spaced-apart at a distance L (FIG. 5) so as to intercept that tornado-borne debris which, in the absence of the reinforcing elements 24, would be capable of penetrating the structure 20. That tornado-borne debris includes items C, D, E, and F (FIG. 2). The reinforcing elements 24 preferably are spaced-apart by at most 6 inches.

To fulfill the above criteria, the reinforcing element may comprise any one of a plurality of structural shapes. The preferred reinforcing element comprises a structural angle 44 (FIG. 10) having mutually perpendicular legs 45, 46. As a general definition, the reinforcing element (angle 44) comprises a longitudinal web (leg 45) presenting inboard and outboard edges 47, 48; and a flange (leg 46) extending from the inboard edge 48 generally perpendicular to the web (leg 45). The width of the longitudinal web (leg 45) exceeds that of the flange (leg 46). The reinforcing element (angle 44) also has a moment of inertia with respect to that centroidal axis X—X which is parallel with the flange (leg 46).

The structural angle 44 is installed in the passageway 43 as shown in FIG. 11. The longitudinal web 45 extends generally normal to the plane of the inner crest 28 and has its outboard edge 48 adjacent to the crests 37 of the outer panel 36 and its inboard edge 48 adjacent to the inner crests 28; and the flange 46 extends generally parallel with the inner crest 28. Thus oriented, the moment of inertia with respect to the centroidal axis X—X thereof extends generally parallel with the inner crest 28.

Other structural shapes which are encompassed within the above general definition are illustrated in FIG. 12 and may comprise a structural Tee 49 (FIG. 12A); a rectangular structural tubing 50 (FIG. 12B); an I-beam 51 (FIG. 12C); a structural channel 52 (FIG. 12D); and a structural Zee 53 (FIG. 12E). It will be observed in FIG. 12 that each of the reinforcing elements 49 through 53 presents at least one longitudinal web 45 and at least one flange 46. Each of the elements 49 through 53 is installed in one of the passageways 43 in the manner illustrated in FIGS. 12A through 12E, respectively.

Figure 15:
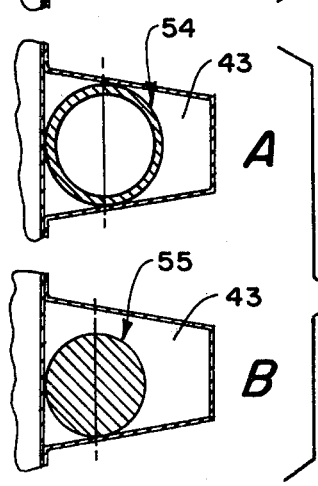
FIGS. 15A and 15B are views similar to FIG. 11 illustrating each of the reinforcing elements of FIGS. 14A and 14B installed in a passageway of the structure of this invention.

Other structural shapes which are useful as reinforcing elements in the present non-composite impact-resistant structure 20 include a round structural tubing 54 (FIG. 14A) and a round bar 55 (FIG. 14B). The tubing 54 and bar 55 are each installed within one of the passageways 43 in the manner illustrated in FIGS. 15A and 15B, respectively.

The pertinent information of typical reinforcing elements 44 and 49 to 55 which are commercially available are tabulated below.

| TYPICAL REINFORCING ELEMENTS | | | | | |
| --- | --- | --- | --- | --- | --- |
| Description | Element | Designation | Weight #/ft | Area in$^2$ | I$_2$ in |
| Structural Angle | 44 | L4 × 3 × 1/4 | 6.2 | 1.81 | 2.91 |
| Structural Tee | 49 | WT4 × 6.5 | 6.5 | 1.91 | 2.90 |
| Rectangular Structural Tubing | 50 | ST4 × 2 × 3/16 | 6.86 | 2.02 | 3.87 |
| I-Beam | 51 | S4 × 7.7 | 7.7 | 2.21 | 6.0 |
| Channel | 52 | C4 × 5.4 | 5.4 | 1.59 | 3.88 |
| Structural Z | 53 | Z4 × 2 × 1/4 | 6.8 | 2.00 | 4.50 |
| Round | | 3.25" O.D. | | | |

-continued

TYPICAL REINFORCING ELEMENTS

| Description | Element | Designation | Weight #/ft | Area in² | I₂ in |
|---|---|---|---|---|---|
| Structural Tubing | 54 | 2.75" I.D. | 8.01 | 2.36 | 2.70 |
| Round Bar | 55 | 2.75" O.D. | 20.2 | 5.94 | 2.81 |

The reinforcing elements 44 and 50 to 55 identified above are sized to fit within the passageway 43 and the cell 32 of commercially available corrugated sheet metal panels 36 and sheet metal cellular panels 25 and 25'.

For example, a commercially available corrugated sheet metal panel 36 is fabricated from cold-rolled steel having a thickness of 16 to 12 gauge. The panel 36 has a depth (the distance between the inner face of the crest 37 and the bottom faces of the valleys 38) of 4.5 inches. The width of the crests 37 is 2.625 inches, and the distance between adjacent valleys 38 is 3.875 inches.

Commercially available sheet metal cellular panels 25 and 25' are assembled from corrugated sheets 27 which are identical in size with the corrugated panels 36 but which are not provided with the male and female lips 40, 41. The corrugated sheets 27 are fabricated from cold-rolled steel having a thickness of 16 to 12 gauge. The flat metal sheets 26 (or 26') are fabricated from cold-rolled steel having a thickness of 16 to 12 gauge.

OUTER DECORATION

If desired, the exterior surface of the resulting non-composite impact-resistant structures 20, 20' and 20" can be covered with a weather-resistant aesthetically attractive sheathing in the form of flat or corrugated metal sheets 56 (FIGS. 4, 16 and 17) or other cladding materials. The metal sheets 56 are secured to the crests 37 of the panels 36 (FIGS. 4 and 16) and to the crests 27 of the outer cellular panels 25 (FIG. 17) by means of screws 57 or pop-rivets. The additional outer decorative sheathing supplies flutes which can be compatible with the flutes of weather-resistant decorative siding in other portions of the resulting building. As an alternative, it is also feasible to provide the corrugated panels 36 and the corrugated sheets 27 of the outer cellular panels 25 with a weather-resistant decorative coating, e.g., paint.

I claim:

1. A structure resistant to penetration by wind-borne debris including
   spaced-apart parallel frame members;
   an inner sheath spanning the distance between said parallel frame members, said inner sheath comprising an inner cellular panel formed from
      a rectangular flat metal sheet secured to each of said frame members, in outboard relation thereto, and
      plural channels disposed outboard of said flat metal sheet and cooperating therewith to form plural parallel inner cells, said channels presenting coplanar inner crests spaced outboard from said flat metal sheet, coplanar inner valleys secured to said flat metal sheet, and inner webs connecting adjacent ones of said inner crests and said inner valleys;
   an outer sheath disposed outboard of said inner cellular panel and comprising
      corrugated panels having coplanar outer valleys extending transversely of and being secured to said inner crests, outer crests spaced outboard from said inner crests, and outer webs connecting adjacent ones of said outer crests and said outer valleys;
   marginal connecting means along the opposite longitudinal sides of said corrugated panels for securing one such panel side-by-side with another such panel;
   said corrugated panels cooperating with said inner sheath to provide passageways, each formed by (a) portions of said inner crests extending between adjacent outer valleys, and (b) the overlying outer crest and the adjoining outer webs; and
   plural reinforcing elements, one disposed within and extending through each of said passageways, and having a length substantially coextensive with the width of said inner cellular panel;
   whereby said reinforcing elements cooperate with said inner sheath and said outer sheath to provide a combined shear barrier and impact cushion which effectively absorbs the kinetic energy of impacting debris.

2. The structure of claim 1 wherein said inner sheath comprises plural inner cellular panels arranged side-by-side and having adjacent longitudinal edges in abutted relation.

3. The structure of claim 2 including lateral connecting means along said longitudinal edges connecting said inner cellular panels one to the other.

4. The structure of claim 1 wherein said corrugated panels are secured to said inner cellular panels by means of fasteners extending through said outer valleys of said corrugated panels and through said inner crests of said inner cellular panels.

5. The structure of claim 1 wherein said outer sheath additionally includes a second flat metal sheet interposed between said outer valleys of said corrugated panel and said inner crests of said inner cellular panel, said second flat metal sheet being secured to said outer valleys of said corrugated panel.

6. The structure of claim 1 wherein said frame members reside in a generally vertical plane and are horizontally presented, said inner cellular panel extending vertically between said frame members.

7. The structure of claim 1 wherein said frame members reside in a generally vertical plane and are vertically presented, said inner cellular panel extending horizontally between said frame members.

8. The structure of claim 1 wherein said frame members reside in a generally horizontal plane.

9. The structure of claim 1 wherein each of said reinforcing elements have a moment of inertia with respect to the centroidal axis thereof which extends generally parallel with said coplanar inner crests, of at least 2.8 inches⁴.

10. The structure of claim 1 wherein each of said reinforcing elements have a cross-sectional area of at least 1.2 inches².

11. The structure of claim 1 wherein said inner webs of said channels have a crushable depth of from 2 to 6 inches, and a corresponding crush resistance of from 2250 to 750 pounds per square inch.

12. The structure of claim 1 wherein each of said reinforcing elements comprises a structural shape including
   a longitudinal web extending generally normal to said coplanar inner crests, and having an outboard edge adjacent to said outer crests and an inboard edge adjacent to said coplanar inner crests, and
   a flange extending from said inboard edge generally parallel with said inner crests.

13. The structure of claim 12 wherein the width of said web exceeds that of said flange.

* * * * *